(12) United States Patent
Lee et al.

(10) Patent No.: US 12,469,869 B2
(45) Date of Patent: Nov. 11, 2025

(54) PLASMA GENERATOR FOR SECONDARY BATTERY AND LAMINATION SYSTEM COMPRISING THE SAME

(71) Applicant: LG Energy Solution, Ltd., Seoul (KR)

(72) Inventors: Sang Kyun Lee, Daejeon (KR); Duck Hoe Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 450 days.

(21) Appl. No.: 17/923,157

(22) PCT Filed: Oct. 8, 2021

(86) PCT No.: PCT/KR2021/013936
§ 371 (c)(1),
(2) Date: Nov. 3, 2022

(87) PCT Pub. No.: WO2022/092616
PCT Pub. Date: May 5, 2022

(65) Prior Publication Data
US 2023/0223576 A1    Jul. 13, 2023

(30) Foreign Application Priority Data
Oct. 30, 2020    (KR) .................. 10-2020-0143819

(51) Int. Cl.
*H01M 10/04*    (2006.01)
*B32B 37/00*    (2006.01)
(Continued)

(52) U.S. Cl.
CPC ..... *H01M 10/0404* (2013.01); *B32B 37/0053* (2013.01); *B32B 37/06* (2013.01);
(Continued)

(58) Field of Classification Search
None
See application file for complete search history.

(56) References Cited

U.S. PATENT DOCUMENTS

| 5,731,872 A | 3/1998 | Falk |
| 2014/0057057 A1 | 2/2014 | Terai |

(Continued)

FOREIGN PATENT DOCUMENTS

| CN | 102977394 A | 3/2013 |
| CN | 108511673 A | 9/2018 |

(Continued)

OTHER PUBLICATIONS

International Search Report for PCT/KR2021/013936 mailed Jan. 24, 2022. 3 pgs.

*Primary Examiner* — Barbara J Musser
(74) *Attorney, Agent, or Firm* — Lerner David LLP

(57) ABSTRACT

A plasma generator for a secondary battery includes a transfer roller for transferring a separator and a plasma generation part configured to form an adhesive surface having adhesive force on a portion of a surface of the separator transferred by the transfer roller and a non-adhesive surface having no adhesive force on a remaining portion. The plasma generation part includes a metal member embedded in the transfer roller, a plasma generation member configured to be spaced apart from the transfer roller and to react with the metal member to generate plasma and thereby form the adhesive surface, and a blocking member on an outer circumferential surface of the transfer roller configured to block the reaction between the metal and plasma generation members and thereby form the non-adhesive surface having no adhesive force on the remaining portion of the surface of the separator.

14 Claims, 14 Drawing Sheets

(51) Int. Cl.
  *B32B 37/06* (2006.01)
  *B32B 38/00* (2006.01)
  *H05H 1/24* (2006.01)

(52) U.S. Cl.
  CPC ...... *B32B 38/0004* (2013.01); *B32B 38/0008* (2013.01); *H05H 1/47* (2021.05); *B32B 2310/14* (2013.01); *B32B 2457/10* (2013.01)

(56) References Cited

U.S. PATENT DOCUMENTS

| | | |
|---|---|---|
| 2019/0027777 A1 | 1/2019 | Lee |
| 2019/0207243 A1 | 7/2019 | Lee |
| 2019/0215944 A1 | 7/2019 | Lee |
| 2019/0333743 A1 | 10/2019 | Yoon |
| 2020/0020953 A1 | 1/2020 | Regula |
| 2020/0185680 A1 | 6/2020 | Kim |

FOREIGN PATENT DOCUMENTS

| | | | | |
|---|---|---|---|---|
| CN | 108933273 A | 12/2018 | | |
| CN | 109119666 A | 1/2019 | | |
| EP | 3503277 A1 * | 6/2019 | ............ | H01M 10/04 |
| JP | 2000195488 A | 7/2000 | | |
| JP | 2002015773 A | 1/2002 | | |
| JP | 2005339895 A | 12/2005 | | |
| KR | 20090050157 A | 5/2009 | | |
| KR | 20090121222 A | 11/2009 | | |
| KR | 100958649 B1 | 5/2010 | | |
| KR | 20170099213 A | 8/2017 | | |
| KR | 20180005472 A | 1/2018 | | |
| KR | 20180009705 A | 1/2018 | | |
| KR | 20180018177 A | 2/2018 | | |
| KR | 20180039452 A | 4/2018 | | |
| KR | 20180039561 A | 4/2018 | | |
| KR | 20180097348 A | 8/2018 | | |
| KR | 20180128757 A | 12/2018 | | |
| KR | 20190000589 A | 1/2019 | | |
| KR | 102054467 B1 | 12/2019 | | |

* cited by examiner

PLASMA GENERATOR FOR SECONDARY BATTERY AND LAMINATION SYSTEM COMPRISING THE SAME

CROSS-REFERENCE TO RELATED APPLICATION

The present application is a national phase entry under 35 U.S.C. § 371 of International Application No. PCT/KR2021/013936 filed on Oct. 8, 2021, and now published as WO 2022/092616 A1, which claims priority from Korean Patent Application No. 10-2020-0143819, filed on Oct. 30, 2020, all of which are hereby incorporated herein by reference in their entireties.

FIELD

The present invention relates to a plasma generator for a secondary battery, which is capable of forming a patterned adhesive surface on a surface of a separator by generating plasma, and a lamination system comprising the same.

BACKGROUND

In general, secondary batteries refer to chargeable and dischargeable batteries, unlike primary batteries that are not chargeable. The secondary batteries are being widely used in the high-tech electronic fields such as mobile phones, notebook computers, and camcorders.

Also, such a secondary battery is classified into a can type secondary battery in which an electrode assembly is built in a metal can and a pouch type secondary battery in which an electrode assembly is built in a pouch. The pouch type secondary battery comprises an electrode assembly, an electrolyte, and a pouch accommodating the electrode assembly and the electrolyte. Also, in the electrode assembly, a positive electrode and a negative electrode are disposed with a separator therebetween. An electrode tab is attached to each of the positive electrode and the negative electrode, and an electrode lead is coupled to each of the electrode tabs.

A lamination process is performed on the secondary battery to improve adhesion of the electrode assembly in which the positive electrode, the separator, the negative electrode are laminated.

However, the secondary battery has a problem in which impregnation force of the electrolyte is significantly reduced even though the positive electrode, the separator, and the negative electrode are improved in bonding property through the lamination process.

Particularly, there is a problem in which a gas generated between the positive electrode and the separator or between the negative electrode and the separator is not smoothly discharged, and thus, it is difficult to secure the uniform quality of the electrode assembly.

SUMMARY OF THE DISCLOSURE

An object of the present invention for solving the above problem is to provide a plasma generator for a secondary battery, in which bondability of a positive electrode, a separator, and a negative electrode increases when a lamination process is performed, and also, impregnation force of an electrolyte increases, and a gas generated between the positive electrode and the separator or between the negative electrode and the separator is easily discharged, and a lamination system comprising the same.

A plasma generator for a secondary battery according to the present invention for achieving the above object comprises: a transfer roller configured to transfer a separator; and a plasma generation part configured to form an adhesive surface having adhesive force on a portion of a surface of the separator, which is transferred by the transfer roller, and a non-adhesive surface having no adhesive force on a remaining portion, wherein the plasma generation part comprises: a metal member embedded in the transfer roller; a plasma generation member provided to be spaced apart from the transfer roller and configured to generate plasma by mutual reaction with the metal member and thereby to form the adhesive surface having the adhesive force on the portion of the surface of the separator; and a blocking member provided on an outer circumferential surface of the transfer roller and configured to block the mutual reaction between the metal member and the plasma generation member and thereby to form the non-adhesive surface having no adhesive force on the remaining portion of the surface of the separator.

The blocking member may be made of a non-conductive material to block the mutual reaction between the metal member and the plasma generation member.

The blocking member may be provided as a ring-shaped band extending along a circumference of the transfer roller and having both ends connected to each other.

The blocking member may be provided as a plurality of blocking films arranged at regular or irregular intervals on the transfer roller.

The blocking member may be formed by attaching a non-conductive film to an outer circumferential surface of the transfer roller.

The blocking member may be formed to be coated with a non-conductive material on an outer circumferential surface of the transfer roller.

An insertion groove may be formed in an outer circumferential surface of the transfer roller, and the blocking member may be provided in the insertion groove of the transfer roller.

An outer circumferential surface of the blocking member provided in the insertion groove and the outer circumferential surface of the transfer roller may have the same height.

The plasma generation member may comprise: a main body provided to correspond to a longitudinal direction of the transfer roller; and an electrode piece provided in the main body and configured to generate plasma by the mutual reaction with the metal member and thereby to form the adhesive surface having the adhesive force on the surface of the separator, wherein the electrode piece may be provided as a corona discharge electrode.

The blocking band may be provided in plurality, which are formed at regular or irregular intervals in a longitudinal direction of the transfer roller.

A lamination system according to the present invention comprises: a plurality of supply rollers configured to supply an electrode and a separator so that the electrode and the separator are alternately laminated; a first cutter configured to cut the electrode; a plasma generator is configured to form an adhesive surface having adhesive force on a portion of a surface of the separator and a non-adhesive surface having no adhesive force on a remaining portion; a laminator configured to thermally fuse the electrode and the separator so as to manufacture a radical unit; and a second cutter configured to cut the radical unit into the same size.

The plasma generator may be configured to form the adhesive surface and the non-adhesive surface on the surface of the separator before the separator and the electrode are thermally fused.

The plasma generator for the secondary battery according to the present invention may comprise the transfer roller and the plasma generation part, wherein the plasma generation part may comprise the metal member, the plasma generation member, and the blocking member. Due to these characteristics, the adhesive surface having the adhesive force and the non-adhesive surface having no adhesive force may be alternately formed on the surface of the separator, and thus, the separator having the patterned adhesive surface may be manufactured.

That is, the plasma generation part may generate the plasma by the mutual reaction with the metal member to form the adhesive surface having the adhesive force on the portion of the surface of the separator, and the blocking member may block the mutual reaction between the metal member and the plasma generation member to form the non-adhesive surface having no adhesive force on the remaining portion of the surface of the separator. As a result, the adhesive force between the separator and the electrode may increase, and the impregnation force of the electrolyte and the gas discharging force between the separator and the electrode may increase.

DETAILED DESCRIPTION

Figure 1:
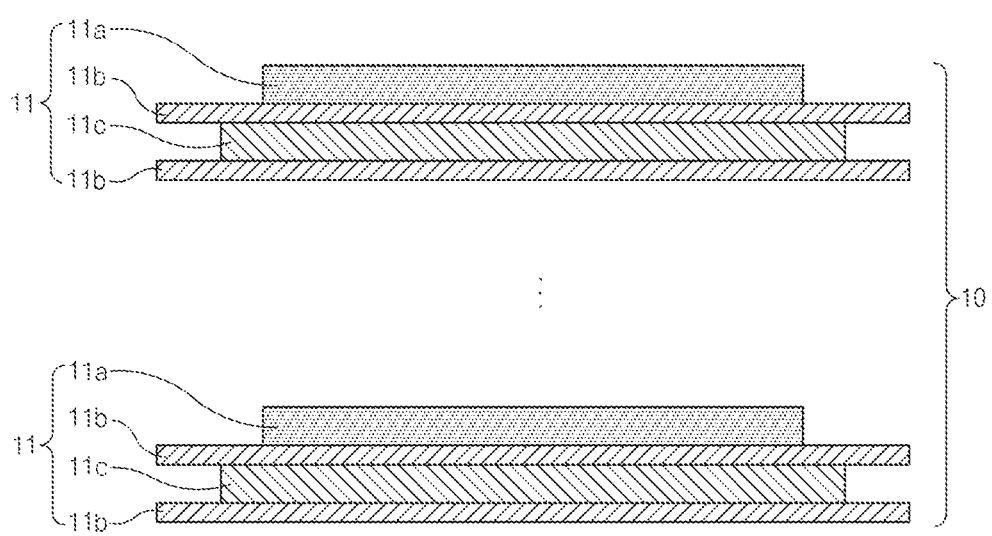
FIG. 1 is a cross-sectional side view of an electrode assembly comprising a radical unit according to an embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Electrode Assembly According to a First Embodiment]

An electrode assembly 10 according to a first embodiment of the present invention may be formed by repeatedly laminating one kind of radical units 11 or two kinds or more of radical units 11 in a predetermined order.

That is, as illustrated in FIG. 1, the electrode assembly 10 according to the first embodiment of the present invention may be formed by vertically laminating a plurality of radical units 11 having the same laminated structure.

For example, the electrode assembly 10 according to the first embodiment of the present invention may have a structure in which the radical unit 11 having a four-layered structure, in which a first electrode 11a that is a positive electrode, a separator 11b, a second electrode 11c that is a negative electrode, and a separator 11b are successively laminated, is repeatedly laminated.

The radical unit 11 may be manufactured through a lamination system. Here, the radical unit 11 may be improved in adhesive force, impregnation force of an electrolyte, and gas discharging force through the lamination system.

[Lamination System According to the First Embodiment]

Figure 2:
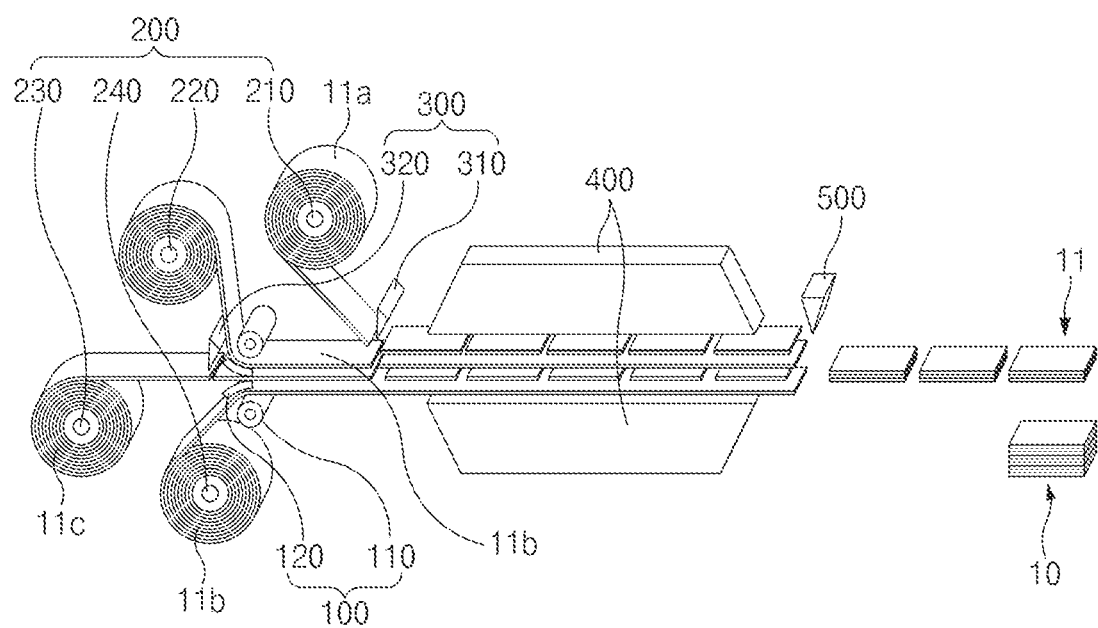
FIG. 2 is a perspective view of a lamination system according to a first embodiment of the present invention.

As illustrated in FIG. 2, a lamination system according to the first embodiment of the present invention may comprise a plurality of supply rollers 200 supplying the electrodes 11a and 11c and the separators 11b to be alternately laminated, a first cutter 300 cutting the electrodes 11a and 11c, a laminator 400 thermally fusing the electrodes 11a and 11c and the separator 11b to manufacture a radical unit sheet, and a second cutter 500 cutting the radical unit sheet by a predetermined size to manufacture the radical unit 11.

Supply Roller

The plurality of supply rollers 200 comprise a first electrode supply roller 210 supplying the first electrode 11a that is the positive electrode, a second electrode supply roller 220 supplying one separator 11b, a second electrode supply roller 230 supplying the second electrode 11c that is the negative electrode, and a second separator supply roller 240 supplying the other separator 11b.

First Cutter

The first cutter 300 comprises a first cutter member 310 cutting one electrode 11a by a predetermined size and a second cutter member 320 cutting the other electrode 11c by a predetermined size.

Laminator

The laminator 400 applies heat to allow the electrodes 11a and 11c to adhere to the separator 11b while pressing the electrodes 111 and 11c and the separator 11b.

Second Cutter

The second cutter 500 cuts the separator 11b between the electrodes 11a and 11c corresponding to each other to manufacture the radical unit 11.

The lamination system comprising the above-described constituents according to the first embodiment of the present invention may manufacture the radical unit 11 in which the electrodes 11a and 11c and the separator 11b are alternately laminated. Then, one or more radical units 11 may be laminated to manufacture an electrode assembly 10.

The lamination system according to the first embodiment of the present invention may comprise a plasma generator 100 for improving the adhesive force of the radical unit 11, the impregnation force of the electrolyte, and the gas discharging force. That is, the plasma generator 100 may form the patterned adhesive surface having the adhesive force on a surface of the separator to allow the separator and the electrode to be bonded to each other. As a result, the adhesive force, the impregnation force of the electrolyte, and the gas discharging force may increase.

Plasma Generator

The plasma generator 100 is configured to form the patterned adhesive surface having the adhesive force on the surface of the separator, as illustrated in FIGS. 3 to 8.

In more detail, the plasma generator 100 may alternately form an adhesive surface 11*b*-1 having adhesive force and a non-adhesive surface 11*b*-2 having no adhesive force or adhesive force less than that of the adhesive surface 11*b*-1 on a surface of the separator 11*b*, and thus, the adhesive surface 11*b*-1 and the non-adhesive surface 11*b*-2 may be patterned at intervals on the surface of the separator 11*b*. As a result, as the electrode and the separator may pattern-adhere to each other, and thus, the adhesive force may increase. Particularly, as the electrolyte or gas passes through the non-adhesive surface 11*b*-2 formed on the surface of the separator 11*b*, the impregnation force of the electrolyte and the gas discharging force may increase.

Figure 3:
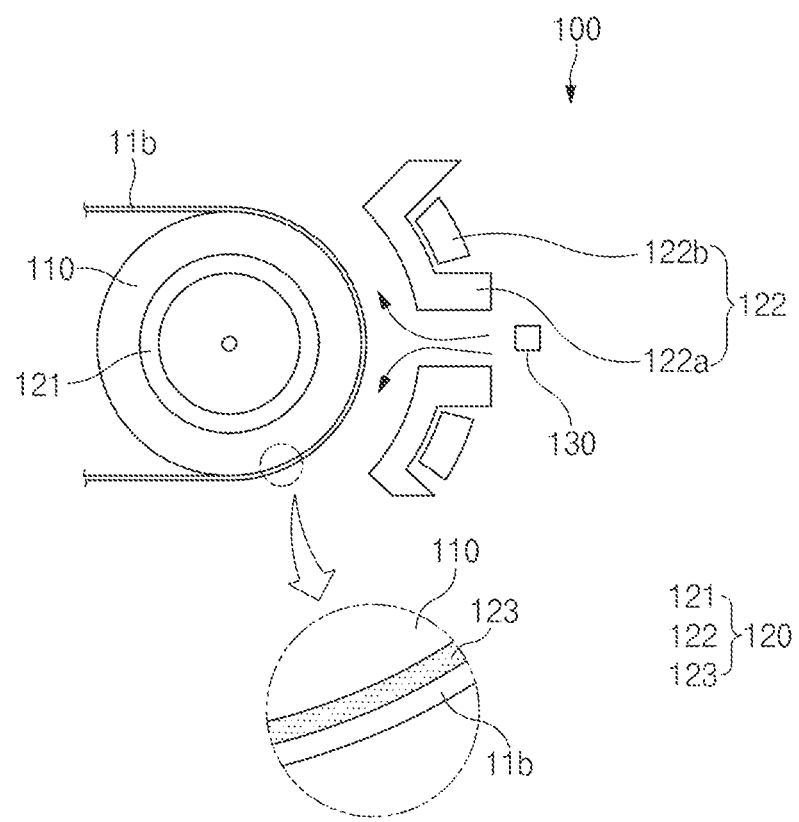
FIG. 3 is a cross-sectional side view illustrating a plasma generator for a secondary battery according to the first embodiment of the present invention.
Figure 4:
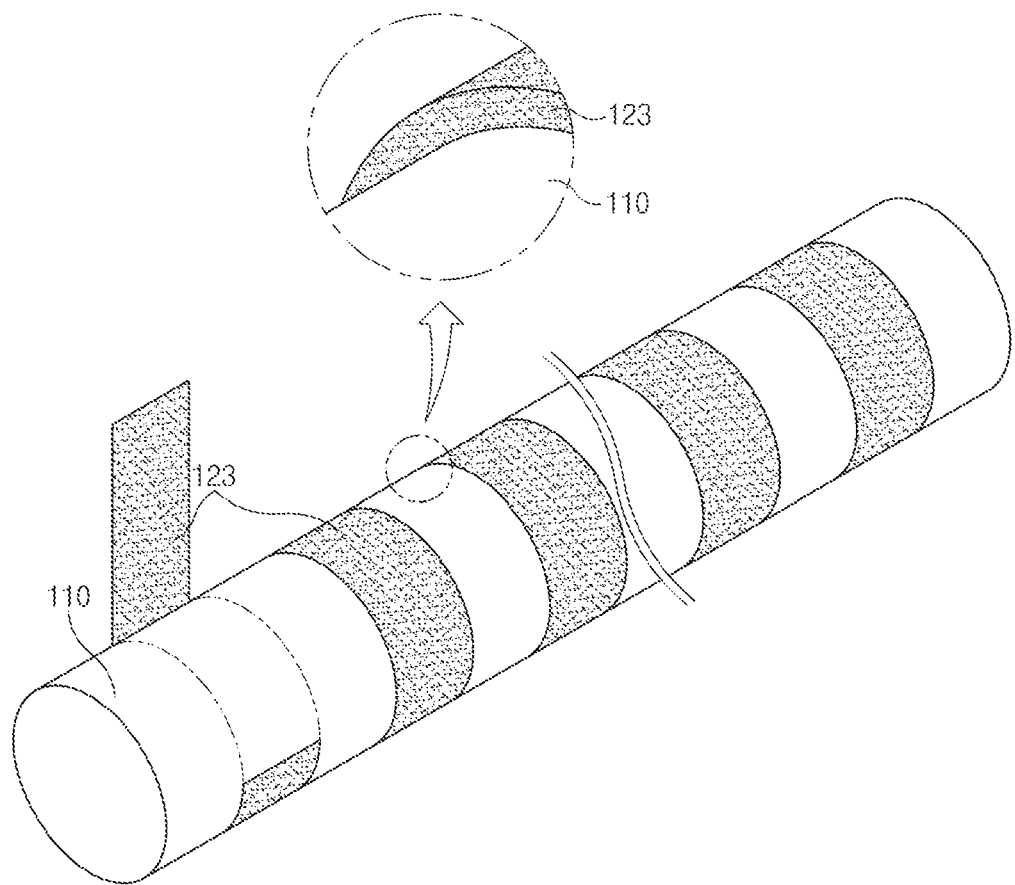
FIG. 4 is a perspective view of a transfer roller provided with a blocking member shown in FIG. 3.
Figure 5:
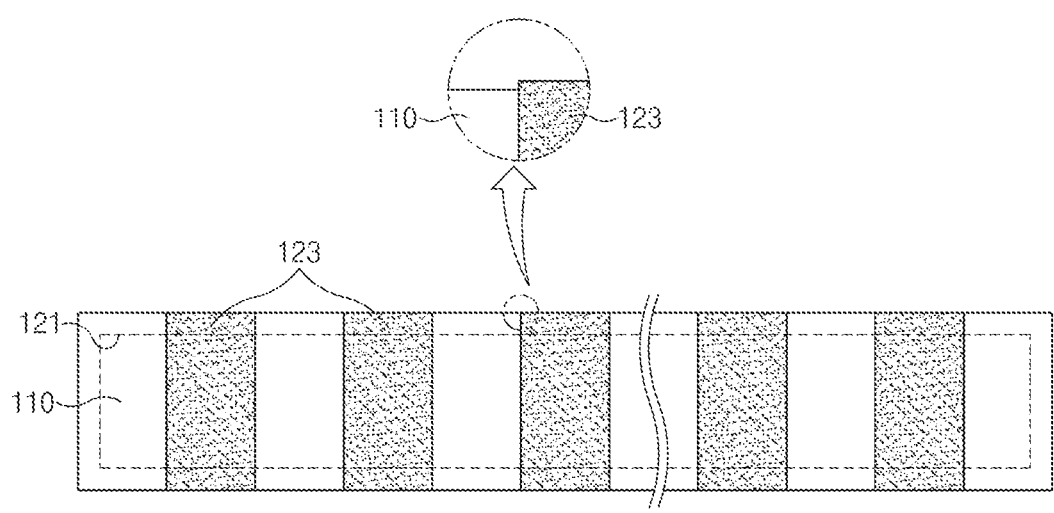
FIG. 5 is a plan view of the transfer roller of FIG. 4.
Figure 6:
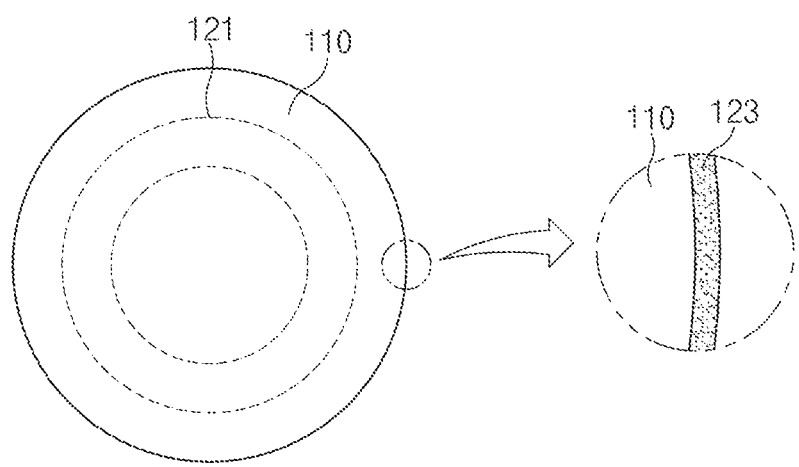
FIG. 6 is a side view of the transfer roller of FIG. 4.
Figure 7:
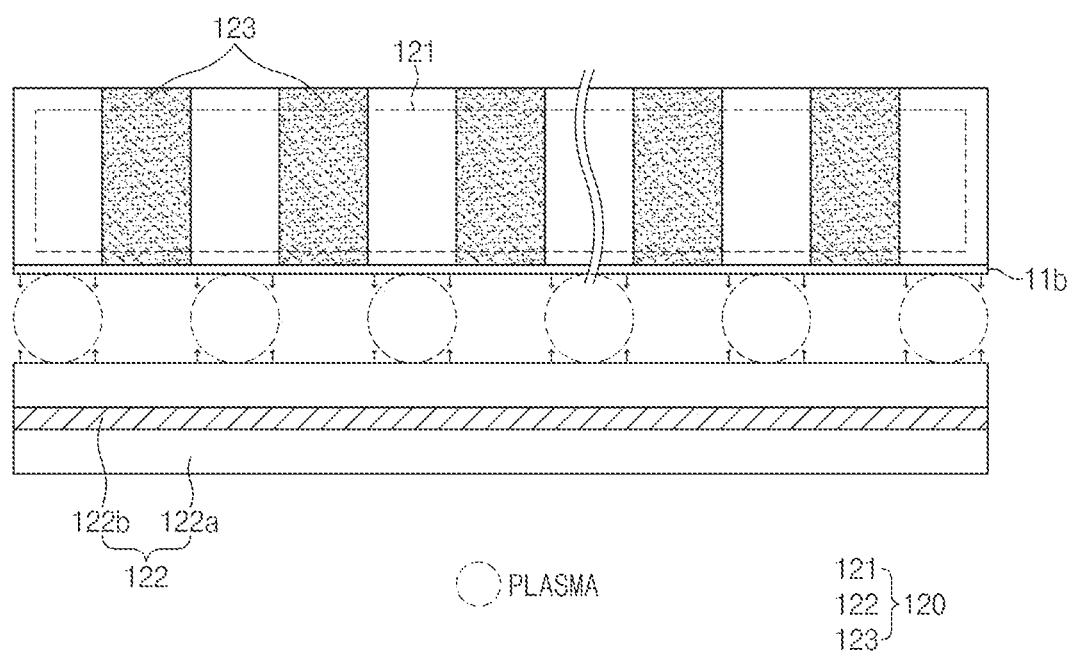
FIG. 7 is a plan view illustrating an operation state of the plasma generator according to the first embodiment of the present invention.

For example, as illustrated in FIG. 3, the plasma generator 100 comprises a transfer roller 110 and a plasma generation part 120, which are respectively provided on the separator 11*b* between the first separator supply roller 220 and the laminator 400 or the separator 11*b* between the second separator supply roller 240 and the laminator 400.

The transfer roller 110 may be disposed to be long in a width direction of the separator to support a bottom surface of the separator 11*b*, and simultaneously, transfer the separator 11*b* in a direction of the laminator 400.

The plasma generation part 120 forms the patterned adhesive surface having the adhesive force on the surface of the separator supported by the transfer roller. That is, the plasma generation part 120 forms an adhesive surface 11*b*-1 having the adhesive force on a portion or a plurality of portions of the surface of the separator 11*b* supported on the transfer roller 110 and a non-adhesive surface 11*b*-2 having no adhesive force or adhesive force less than that of the adhesive surface 11*b*-1 on a remaining portion of the separator 11*b*. Thus, it is possible to form the patterned adhesive surface having the adhesive force on the surface of the separator.

More specifically, the plasma generation part 120 comprises a metal member 121, a plasma generation member 122, and a blocking member 123.

The metal member 121 has a cylindrical shape, is embedded into the transfer roller 110, and is configured to extend in a longitudinal direction of the transfer roller 110.

The plasma generation member 122 is provided to be spaced apart from the transfer roller 110, and generates plasma by mutual reaction with the metal member 121 embedded in the transfer roller 110 to form the adhesive surface 11*b*-1 having the adhesive force on the separator 11*b*.

That is, the plasma generation member 122 comprises a main body 122*a* provided to correspond to the longitudinal direction of the transfer roller 110 and an electrode piece 122*b* provided in the main body 122*a* and generating plasma by the mutual reaction with the metal material 121 to form the adhesive surface 11*b*-1 having the adhesive force on the surface of the separator 11*b*.

The main body 122*a* may be made of a non-metallic material. Thus, an occurrence of resistance between the metal member 121 and the electrode piece 122*b* may be prevented to stably generate the plasma between the metal member 121 and the main body 122*a*.

The main body 122*a* may be made of ceramic of the non-metallic material. The ceramic is a non-metallic inorganic material obtained through a thermal treatment process and has heat resistance, high strength, and corrosion resistance. Particularly, since the ceramic is lightweight, efficiency of use may be improved.

The electrode piece 122*b* is provided on an outer surface of the main body 122*a* that does not face the separator 11*b* and is provided to extend in a longitudinal direction (i.e., a width direction of the separator) of the main body 122*a*. The electrode piece 122*b* may be a corona discharge electrode. The corona discharge electrode may stably generate the plasma between the metal member 252 and the main body 122*a*.

The blocking member 123 is provided on an outer circumferential surface of the transfer roller 110 to block the mutual reaction between the metal member 121 and the plasma generation member 122, thereby forming the non-adhesive surface 11*b*-2 having no adhesive force on the remaining portion of the surface of the separator 11*b*.

The plasma generation part 120 having such a configuration forms the adhesive surface 11*b*-1 having the adhesive force due to the plasma, which is generated by the mutual reaction between the metal member 121 and the plasma generation member 122, on the surface of the separator 11*b* supported on the transfer roller 110 having no blocking member 123 and the non-adhesive surface 11*b*-2 having no adhesive force on the surface of the separator supported on the transfer roller 110 provided with the blocking member 123 because the plasma is not generated by blocking the mutual reaction between the metal member 121 and the plasma generation member 122. As a result, an adhesive layer having a pattern structure in which the adhesive surface and the non-adhesive surface are alternately formed may be formed on the surface of the separator 11*b*.

Thus, the plasma generator 100 may comprise the transfer roller 110 and the plasma generation part 120. Here, the plasma generation part 120 may comprise the metal member 121, the plasma generation member 122, and the blocking member 123 to pattern the adhesive surface having the adhesive force on the surface of the separator, and the electrode and the separator may pattern-adhere to each other through the patterned adhesive surface to increase in adhesive force. Particularly, as the electrolyte and the gas pass through the non-adhesive portion of the electrode and the separator, the impregnation force of the electrolyte and the gas discharging force may increase.

The blocking member 123 may be made of a non-conductive material, and thus, the metal member 121 and the plasma generation member 122 may be blocked so as not to react with each other, and as a result, the non-adhesive surface may be stably formed on the surface of the separator. For example, the blocking member may be made of any one of a synthetic resin, silicone, a rubber material, and urethane.

Particularly, the blocking member 123 is provided as a ring-shaped blocking band extending along the outer circumferential surface of the transfer roller 110 and having both ends connected to each other. Thus, the blocking member 1230 may be stably attached to the outer circumferential surface of the transfer roller 110, and as a result, the coupling force may increase.

The blocking band is not provided on the outer circumferential surface of the transfer roller 110 on which both ends of the separator are disposed. Thus, the adhesive surface having the adhesive force may be formed on both the ends of the separator, and as a result, the adhesive force between an end of the separator and an end of the electrode may increase.

Particularly, the blocking band may be provided in plurality at regular or irregular intervals in the longitudinal direction of the transfer roller 110, and thus, a plurality of non-adhesive surfaces 11*b*-2 and a plurality of adhesive surfaces 11*b*-1 may be alternately formed at regular or irregular intervals on the surface of the separator 11*b*.

The plurality of blocking bands may be provided on the outer circumferential surface of the transfer roller 110, and a width of each of the blocking bands may be gradually reduced from a center line that equally divides the longitudinal direction of the transfer roller to both the ends. That is, the blocking band provided at the center line of the transfer roller is formed with a first width to form a non-adhesive surface having a size corresponding to the first width at a center in the width direction of the separator, and the blocking band provided at each of both the ends of the transfer roller is formed with a second width less than the first width to form a non-adhesive surface having a size corresponding to the second width in the width direction of the separator. Thus, the large non-adhesive surface may be secured at the center of the separator to increase in impregnation force of the electrolyte and gas discharging force, and the small non-adhesive surface may be secured at both the ends of the separator to increase in adhesive force between the electrode and the separator.

The plasma generator 100 may further comprise an air supply member 130 supplying air between the transfer roller 110 and the plasma generating part 120. The air supply member 130 may supply the air between the transfer roller 110 and the plasma generating part 120 to more stabilize the plasma.

Figure 8:
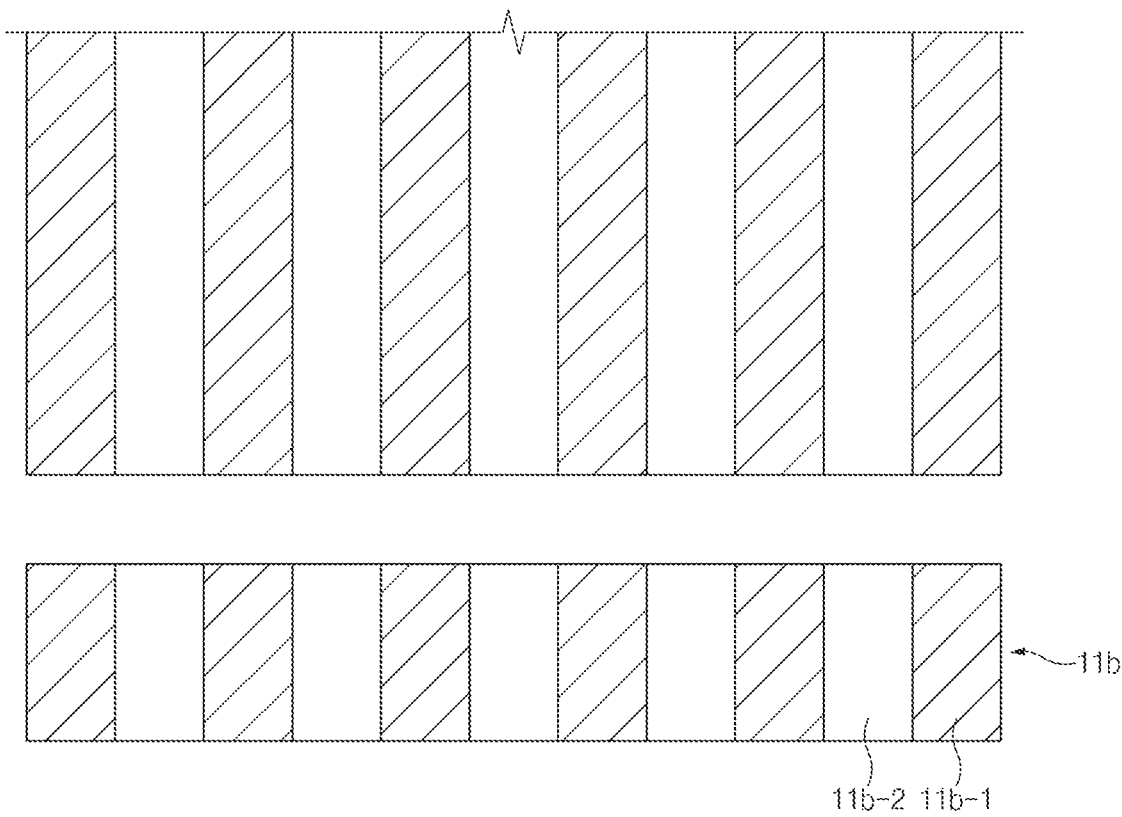
FIG. 8 is a plan view illustrating a separator manufactured by the plasma generator for the secondary battery according to the first embodiment of the present invention.

Therefore, the lamination system according to the first embodiment of the present invention may comprise the plasma generator 100 to manufacture the separator having the patterned adhesive surface as illustrated in FIG. 8. Also, the separator and the electrode may be bonded to each other to manufacture the radical unit having the high bondability, impregnation force of the electrolyte, and gas discharging force.

Hereinafter, in descriptions of another embodiment of the present invention, constituents having the same constituent and function as the above-mentioned embodiment have been given the same reference numeral in the drawings, and thus duplicated description will be omitted.

[Plasma Generator According to Second Embodiment]

Figure 9:
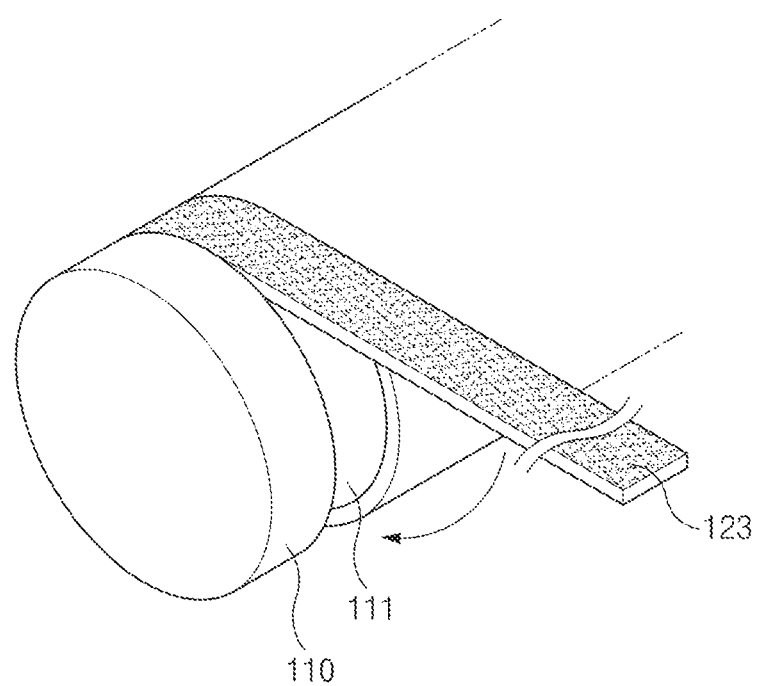
FIG. 9 is a perspective view illustrating a transfer roller provided with a blocking member of a plasma generator for a secondary battery according to a second embodiment.
Figure 10:
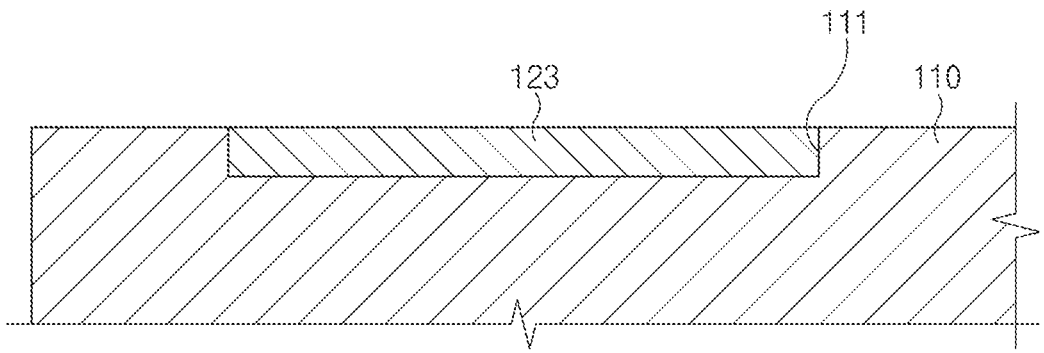
FIG. 10 is a partial cross-sectional view of the transfer roller provided with the blocking member of FIG. 9.

As illustrated in FIGS. 9 and 10, a plasma generator according to a second embodiment of the present invention comprises a blocking member 123. Here, the blocking member 123 is provided in an insertion groove 111 formed in an outer circumferential surface of a transfer roller 110. Here, the insertion groove 111 has a structure connected along a circumferential direction of the transfer roller 110. Thus, the blocking member 123 may be more conveniently provided on the outer circumferential surface of the transfer roller 110.

Particularly, an outer circumferential surface of the blocking member 123 provided in the insertion groove 111 and the outer circumferential surface of the transfer roller 110 have the same height to prevent a height difference from occurring between the transfer roller 110 and the blocking member 123, thereby more stably transferring a separator through the transfer roller.

[Plasma Generator According to Third Embodiment]

A plasma generator according to a third embodiment of the present invention comprises a blocking member 123. Here, the blocking member 123 is provided with a plurality of blocking films arranged at regular or irregular intervals on an outer circumferential surface of a transfer roller 110.

Figure 11:
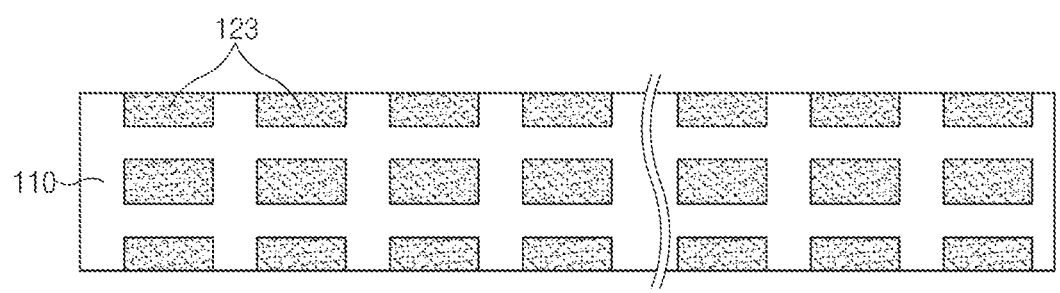
FIG. 11 is a front view illustrating a transfer roller provided with a blocking member of a plasma generator for a secondary battery according to a third embodiment.

For example, as illustrated in FIG. 11, the plurality of blocking films may be provided to be arranged at set intervals along a longitudinal direction and a circumferential direction of the transfer roller 110. Thus, it is possible to pattern a checkerboard-shaped adhesive surface having adhesive force on a surface of the separator.

According to another embodiment of the present invention, the blocking member 123 may be formed to be coated with a non-conductive material on an outer circumferential surface of the transfer roller 110 along a circumference of the transfer roller. Thus, the coupling force between the transfer roller 110 and the blocking member 123 may significantly increase.

Experimental Example

Experiment Preparation

Three radical units manufactured by the lamination system according to the first embodiment of the present application are prepared. That is, the lamination system according to the first embodiment of the present application manufactures a separator 11*b* in which an adhesive surface 11*b*-1, a non-adhesive surface 11*b*-2, and an adhesive surface 11*b*-1 are alternately formed and then laminates and bonds the separator and an electrode to manufacture a radical unit.

In Manufacturing Example, three radical units manufactured as described above are prepared (see FIG. 12).

Bonding Strength Test

The electrodes and the separators provided in the three radical units, which are prepared as described above, according to Manufacturing Example are separated from each other to measure a load on an adhesive interface. As a result, the same graph as that in FIG. 12 may be obtained.

Figure 12:
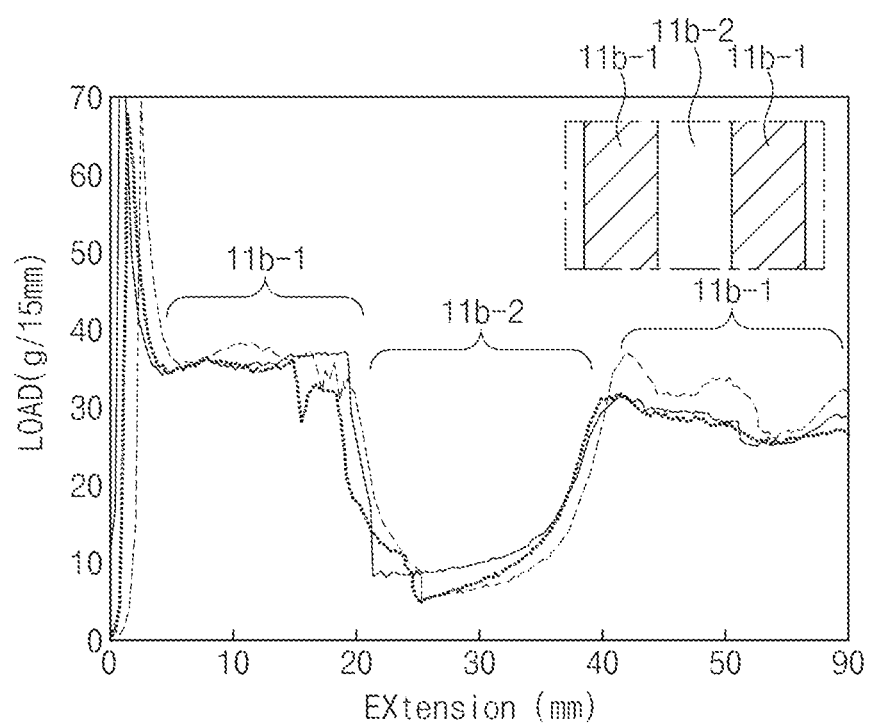
FIG. 12 is a graph illustrating experimental results obtained by different adhesive forces of a radical unit according to a Manufacturing Example of the present invention.

That is, referring to FIG. 12, it may be seen that a load of approximately 35 g/mm occurs on a first adhesive portion (i.e., adhesive surface) between the electrode and the separator. In addition, it may be confirmed that a load of 5 g/mm occurs at the non-adhesive portion between the electrode and the separator. Here, 5 g/mm occurring at the portion at which the electrode and the separator are not bonded to each other may be bonding force generated by a laminator. In addition, it may be seen that a load of about 32 g/mm occurs at a second adhesive portion between the electrode and the separator.

Therefore, it may be confirmed that a patterned adhesive surface is stably formed on a surface of the separator in the radical unit, which is manufactured through the lamination system according to the first embodiment of the present invention, through the experimental results as described above.

Impregnation Test of Electrolyte

In Manufacturing Example, three radical units in which the electrode and the separator are pattern-bonded to each other and which is manufactured through the lamination system according to the first embodiment of the present invention are prepared.

In Comparative Example, three radical units in which an electrode and an entire separator are bonded to each other are prepared.

The radical unit according to Comparative Example and the radical unit according to Manufacturing Example, which are prepared as described above, are put into the same water tank stored in the electrolyte for 1 minute, and then are put out of the water tank.

Figure 13:
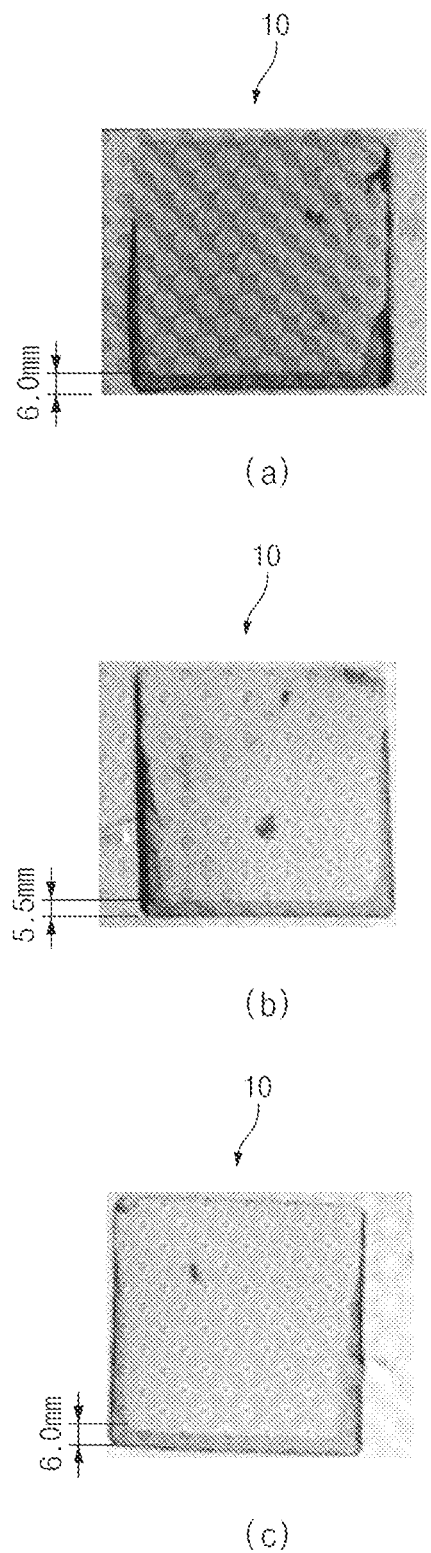
FIG. 13 is a set of photographs illustrating an experiment related to an impregnation force of an electrolyte of a radical unit according to a Comparative Example.
Figure 14:
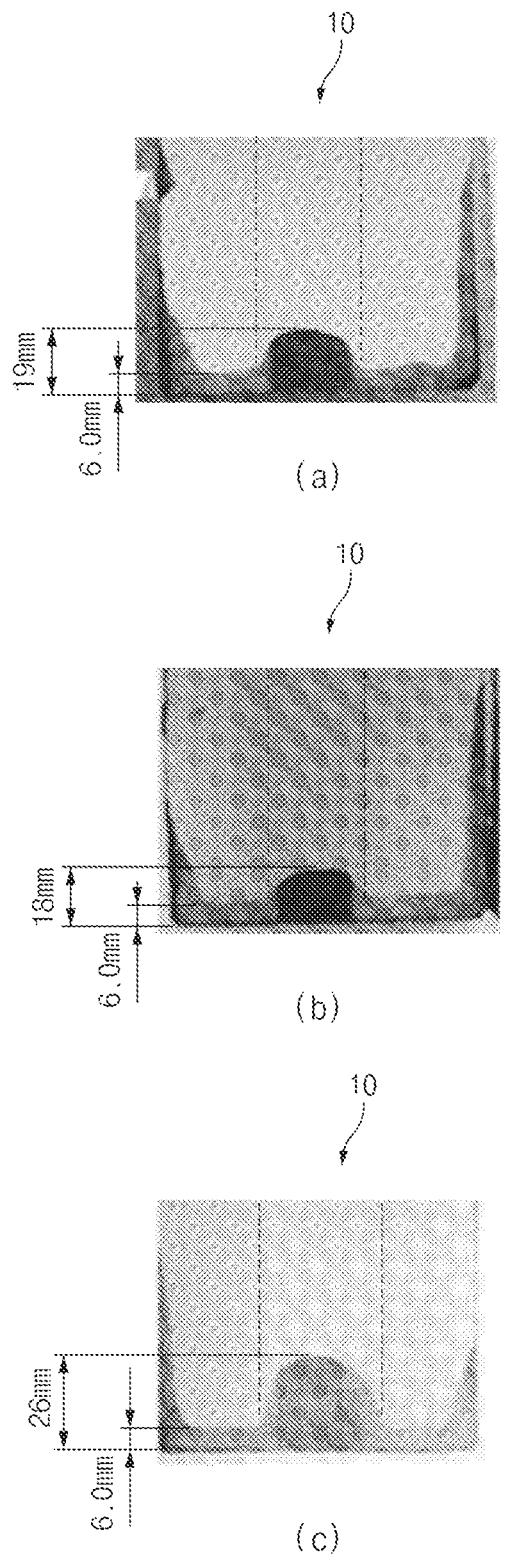
FIG. 14 is a set of photographs illustrating an experiment related to an impregnation force of an electrolyte of a radical unit according to a Manufacturing Example.

As a result of the experiment, referring to FIG. 13, in Comparative Example, it may be confirmed that the electrolyte is impregnated to a depth of 5.5 mm to 6.0 mm when measuring impregnation force of the electrolyte with respect to each of the three radical units. In addition, referring to FIG. 14, in Manufacturing Example, it may be seen that the electrolyte is impregnated up to a minimum depth of 6 mm and a maximum depth of 26 mm. In this case, it may be confirmed that the minimum electrolyte-impregnated portion is the bonding portion between the electrode and the separator, and the maximum electrolyte-impregnated portion is the non-bonding portion between the electrode and the separator.

Therefore, it may be seen that the impregnation force of the electrolyte in Manufacturing Example is significantly improved when compared to that in Comparative Example.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

DESCRIPTION OF THE SYMBOLS

11: Radical unit
10: Electrode assembly
100: Plasma generator
110: Transfer roller
111: Insertion groove
120: Plasma generation part
121: Metal member
122: Plasma generation member
122a: Main body
122b: Electrode piece
123: Blocking member
200: Supply roller
300: First cutter
400: Laminator
500: Second cutter

The invention claimed is:

1. A plasma generator for use in manufacturing a secondary battery, the secondary battery comprising an electrode assembly comprising first and second electrodes separated by a separator and the plasma generator comprising:
    a transfer roller configured to transfer the separator; and
    a plasma generation part configured to form an adhesive surface having an adhesive force on a portion of a surface of the separator and a non-adhesive surface having no adhesive force on a remaining portion of the surface of the separator,
    wherein the plasma generation part comprises:
    a metal member embedded in the transfer roller;
    a plasma generation member configured to be spaced apart from the transfer roller and to generate plasma by mutual reaction with the metal member and thereby to form the adhesive surface on the portion of the surface of the separator; and
    a blocking member located on an outer circumferential surface of the transfer roller and configured to block the mutual reaction between the metal member and the plasma generation member such that the non-adhesive surface is formed on the remaining portion of the surface of the separator,
    wherein the blocking member is made of a non-conductive material.

2. The plasma generator of claim 1, wherein the blocking member is configured to block the mutual reaction between the metal member and the plasma generation member.

3. The plasma generator of claim 2, wherein the blocking member includes a ring-shaped band extending along a circumference of the transfer roller and having ends connected to each other.

4. The plasma generator of claim 3, wherein the blocking member includes additional bands extending along the circumference of the transfer roller, the additional bands being formed at regular or irregular intervals in a longitudinal direction of the transfer roller.

5. The plasma generator of claim 2, wherein the blocking member includes a plurality of blocking films arranged at regular or irregular intervals on the transfer roller.

6. The plasma generator of claim 2, wherein the blocking member includes a non-conductive film attached to an outer circumferential surface of the transfer roller.

7. The plasma generator of claim 2, wherein the blocking member is a coating of the non-conductive material on an outer circumferential surface of the transfer roller.

8. The plasma generator of claim 1, wherein the plasma generation member comprises:
    a main body extending in a direction corresponding to a longitudinal direction of the transfer roller; and
    an electrode piece received in the main body and configured to generate plasma by the mutual reaction with the metal member and thereby to form the adhesive surface on the surface of the separator,
    wherein the electrode piece acts as a corona discharge electrode.

9. The plasma generator of claim 1, wherein the plasma generation part forms the adhesive surface on the portion of the surface of the separator during a transfer of the separator by the transfer roller.

10. A plasma generator for use in manufacturing a secondary battery, the secondary battery comprising an electrode assembly comprising first and second electrodes separated by a separator and the plasma generator comprising:
    a transfer roller configured to transfer the separator; and
    a plasma generation part configured to form an adhesive surface having an adhesive force on a portion of a surface of the separator and a non-adhesive surface having no adhesive force on a remaining portion of the surface of the separator,
    wherein the plasma generation part comprises:
    a metal member embedded in the transfer roller;
    a plasma generation member configured to be spaced apart from the transfer roller and to generate plasma by mutual reaction with the metal member and thereby to form the adhesive surface on the portion of the surface of the separator; and
    a blocking member located on an outer circumferential surface of the transfer roller and configured to block the mutual reaction between the metal member and the plasma generation member such that the non-adhesive surface is formed on the remaining portion of the surface of the separator, wherein an insertion groove is formed in an outer circumferential surface of the transfer roller, and the blocking member is received in the insertion groove of the transfer roller.

11. The plasma generator of claim 10, wherein the blocking member when received in the insertion groove is flush with the outer circumferential surface of the transfer roller.

12. A lamination system comprising:
a plurality of supply rollers configured to supply an electrode and a separator so that the electrode and the separator are alternately laminated;
a first cutter configured to cut the electrode;
the plasma generator of claim 1;
a laminator configured to thermally fuse the electrode and the separator so as to form a radical unit sheet; and
a second cutter configured to cut the radical unit sheet into a radical unit of a predetermined size.

13. The lamination system of claim 12, wherein the plasma generator is configured to form the adhesive surface and the non-adhesive surface on the surface of the separator before the separator and the electrode are thermally fused.

14. A plasma generator for use in manufacturing a secondary battery, the secondary battery comprising an electrode assembly comprising first and second electrodes separator by a separator and the plasma generator comprising:
a transfer roller configured to transfer the separator; and
a plasma generation part configured to generate plasma and thereby to form an adhesive surface on a portion of a surface of the separator during a transfer of the separator by the transfer roller; and
a blocking member configured to prevent the formation of the adhesive surface on the remaining portion of the surface of the separator during the transfer of the separator by the transfer roller,
wherein the blocking member is made of a non-conductive material.

* * * * *